United States Patent Office 3,020,408
Patented Feb. 6, 1962

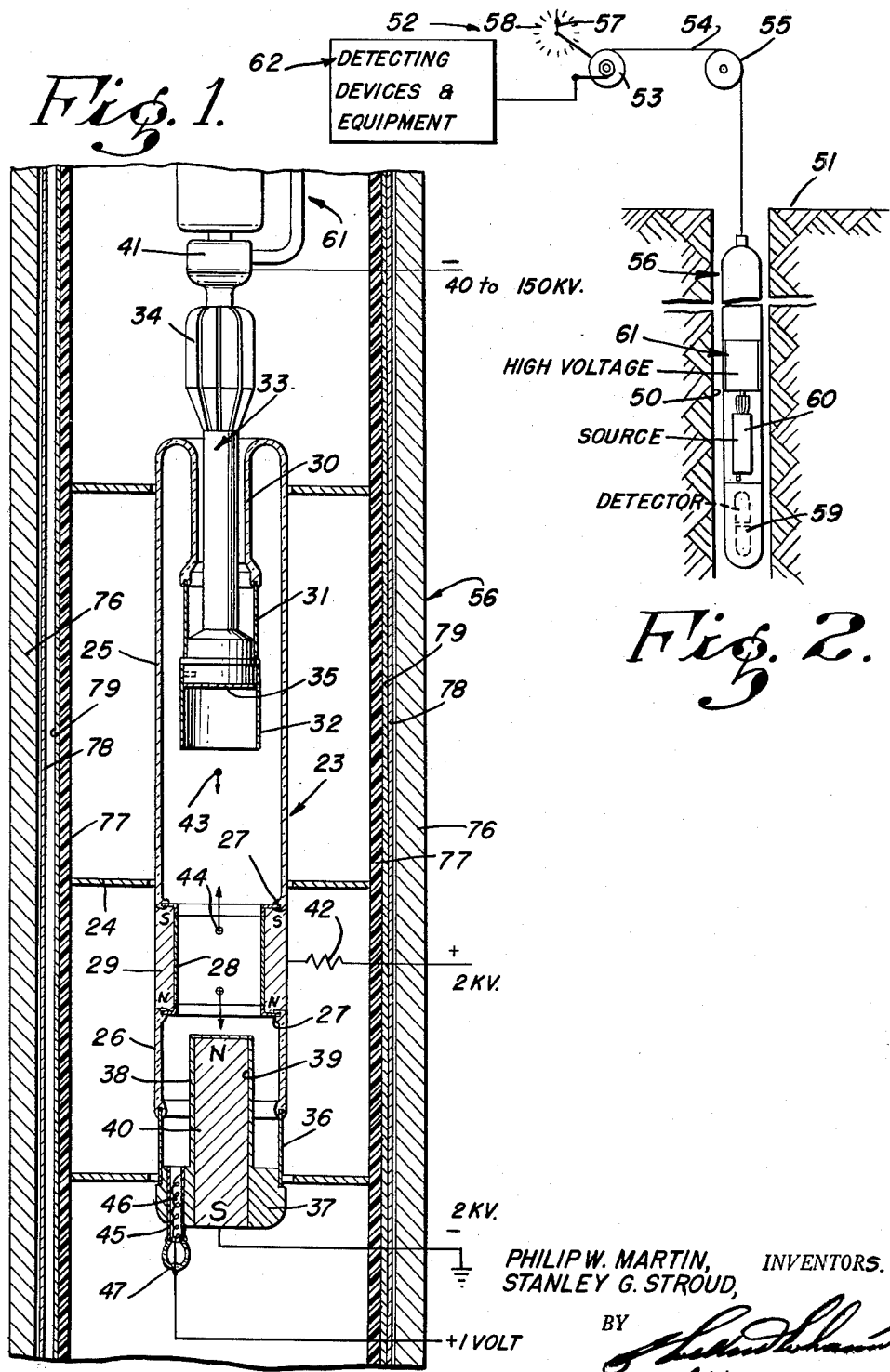

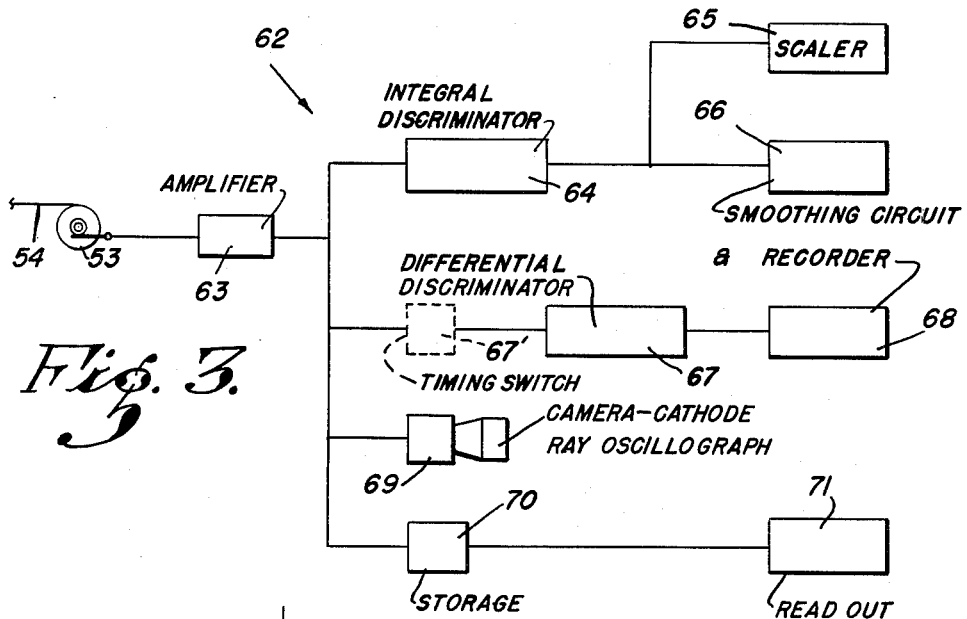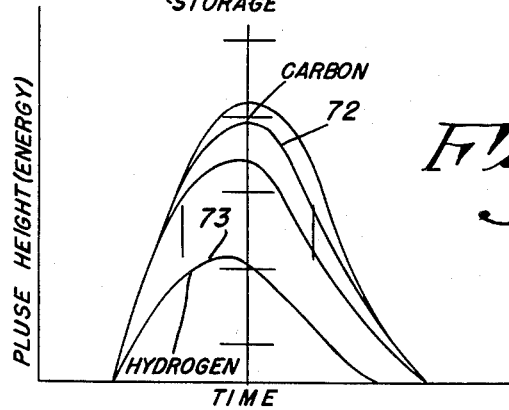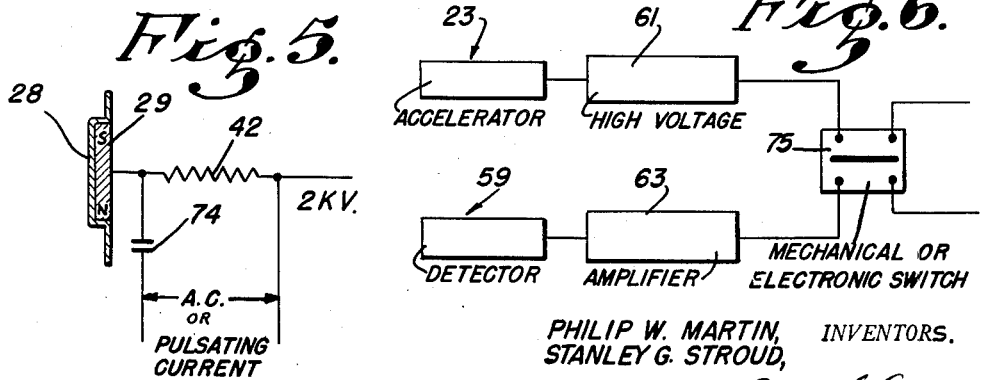

3,020,408
NUCLEAR ANALYTICAL APPARATUS
Philip W. Martin, 1345 West Road, Whittier, Calif., and Stanley G. Stroud, Redondo Beach, Calif. (2109 Summerland Ave., San Pedro, Calif.)
Filed Nov. 14, 1955, Ser. No. 546,563
5 Claims. (Cl. 250—84.5)

The present invention relates generally to nuclear analytical apparatus for the investigation of substances with the aid of high energy neutrons, and is more particularly concerned with an improved method and apparatus for the generation of high energy neutrons for bombarding the substance to be investigated, and means for detecting and analyzing resulting radiations from the substance.

The invention is susceptible of wide and varied uses. As one example of its many uses, the invention will be described as embodied in apparatus which may be used for radioactivity logging of oil well bores and other subsurface formations, and which enables the conducting of exploratory investigations of earth formations by bombarding such formations with relatively high energy neutrons.

It is one object of the present invention to provide an improved simplified ion accelerator utilizing a deuterium-tritium or a tritium-deuterium reaction for generating high energy neutrons of the order of approximately 14 mev. energy which may be used for the investigation and analysis of materials and substances.

A further object is to provide an ion accelerator which is self-contained and needs none of the usual pumps for maintaining pressure differentials as heretofore required by conventional accelerators previously available as a high energy neutron source. In ion accelerators as heretofore constructed different elements were utilized for the ion source and for the acceleration of the produced ions. In the accelerator of the present invention the same elements are utilized for the production and acceleration of the ions, thus eliminating the need for auxiliary pumps and other ancillary equipment such as formerly required. By utilizing the same elements, working from the same voltage supply, it is possible to control and stabilize the accelerator by varying the relative potentials at various points of the envelope containing the elements. The use of hot wires, or radioactive frequency sources of ion supply are thereby eliminated.

A still further object is to provide an ion accelerator source of high energy neutrons, which is so constructed that it may be readily pulsed to permit the beam of high energy neutrons to be turned "on" and "off" at desired intervals. This is an important feature in that it enables the study of isotopes in the substances being investigated, which result from the neutron bombardment and may have an extremely or very short half-life.

Another object of the invention is to provide an ion accelerator source of high energy neutrons, wherein unique provision is made for maintaining and a replenishing the ionizable material in the accelerator so that the operating period may be extended to practical operating life.

Still another object of the present invention is to provide an ion accelerator of the linear type which is of sufficiently small size to permit its use within the limited available space of a well logging tool. Prior art ion accerators and reactors, due to the nature of their construction, were not suitable for use in a bore hole. These reactors necessitated that the ions be produced in a relatively dense atmosphere and that continuous evacuation be maintained of the space in which the ions were to be accelerated. Pumps for maintaining the required vacuum are unsuited for installation in the limited available space of well logging equipment. The present invention proposes to overcome this difficulty by the provision of a self-contained accelerator in which the ion source and ion acceleration takes place in the same compartment under the same pressure, so that pumps will not be required to maintain a pressure differential as in the case of prior art reactors.

A still further object of the invention is to provide unique radioactivity well logging apparatus utilizing the high energy neutron source made available by the ion accelerator described herein, wherein a hydrocarbon log in the form of characteristic spectra may be obtained directly in a well bore. That is, a log in which the spectra indicate oil directly rather than indirectly as in the cases of an electric log or conventional radioactive methods which indicate something other than hydrocarbon from which the presence of the hydrocarbon must be deduced.

Although conventional neutron sources such as radium-beryllium or polonium-beryllium have been used to obtain a hydrogen gamma ray log, it is known that such sources are unsatisfactory for the production of a carbon gamma ray log due to the large carbon gamma ray back ground produced by the sources themselves, which may obscure the carbon gamma rays produced in the well formation. The ion accelerator of our invention produces no gamma rays at the neutron source, and forms a substantially mono-energetic neutron source which may be utilized to bombard the well formations so as to excite the higher excitation levels therein and permit a spectral analysis of neutrons and carbon gamma rays returning from the formation due to gamma rays of inelastic scattering. Carbon, to the bombarding high energy neutrons, presents a relatively high cross-section and only one sharp and distinct gamma ray in its spectra, thus giving a direct indication of the presence of hydrocarbon or oil. It is also possible by this process to detect the presence of other elements, such as hydrogen, calcium, chlorine and the like.

Activated neutron logs have heretofore been exceedingly expensive and have been limited by the lack of a suitable high energy neutron source which could be placed in the well and which would produce sufficient neutron flux to activate other elements and permit an indication of their presence by their energy levels and by their half-life. For example, by the use of the accelerator described herein and a scintillation spectrometer, it is possible to obtain sufficient neutron flux to enable obtainment of a continuous log of sodium. It is thus possible to locate salt water in a well. A whole new field of well logging is accordingly made available by the present invention.

A further advantage is obtained by the apparatus of the herein described invention in well logging, in that, the availability of the higher neutron flux enables higher running speed in the well and speedier logging operations. This is an important factor economically, and also since when more events are detected for an interval of time, lower statistical fluctuation will be noted and more accurate logs produced.

The use of higher energy neutrons and greater flux has an additional advantage in that it enables greater spacing to be utilized between the neutron source and the detector, thus averaging the detected effects proportionally over a greater area of the formation. A truer and sharper log of the formation will therefore result.

With the foregoing in mind, the present invention proposes to utilize an elongate envelope in the form of a tube which provides a single compartment containing both the ionization source and the accelerating section, the tube being charged with low pressure hydrogen gas containing a mixture of deuterium and tritium. A cathode target of a suitable metal, which may be silver, is utilized, this target being arranged to be bombarded by deuterium and tritium ions which act to build up a deposit of both deuterium and tritium which upon subsequent bombardment by other ions will emit neutrons by a deuterium-tritium reaction or a tritium-deuterium reaction. In the deuterium-tritium reaction, for example, a deuterium atom and a tritium atom react to produce an alpha particle and a neutron of approximately 14 mev. energy. The kinetic energy of the bombarding atom together with the 17.6 mev. reaction energy is divided between the resulting neutron and alpha particle. Electrons are accelerated into the ionizing region of the tube along a spiral oscillating path produced by the combined effects of electric and magnetic fields. Ionization of the gas in the tube acts as a vacuum pump to deplete the ionizable material, and this action would soon clean up the tube and stop its operation, unless means were provided for maintaining and replenishing the hydrogen gas in the tube. This replenishment is accomplished by providing a built-in heater coil of titanium, zirconium or other material which will take up hydrogen when cooled, but give off hydrogen when heated. By control of the heating of this coil, the operating characteristics of the tube may be maintained.

Further objects and advantages of the invention will be brought out in the following part of the specification, wherein detailed description is for the purpose of fully disclosing the invention without placing limitations thereon.

Referring to the accompanying drawings, which are for illustrative purposes only:

FIG. 1 is a longitudinal sectional view of an ion accelerator high energy neutron source embodying the features of the present invention;

FIG. 2 is a diagrammatic view illustrating an embodiment of the present invention in exploratory apparatus for oil well bores and other subsurface formation investigations;

FIG. 3 is a view schematically illustrating further details of detecting devices and equipment, which may be utilized in the present invention;

FIG. 4 diagrammatically illustrates a representative spectrum obtained for carbon by the apparatus of the herein described invention;

FIG. 5 illustrates schematically one manner in which the ion accelerator of the present invention may be modulated; and FIG. 6 is a view schematically showing a pulsing switching arrangement for alternately connecting and disconnecting the accelerator and detector.

Referring to the drawings, there is illustrated in FIG. 1 a neutron source according to the present invention which includes a linear accelerator as generally indicated by the numeral 23 by which a deuterium-tritium reaction may be carried out for the production of high energy neutrons for irradiating materials, substances and earth formations for the purpose of determining their identities and characteristics.

More specifically the accelerator comprises an elongate tube structure which is supported within a suitable rack or cradle 24 within an exploration unit housing.

The tube forms a hollow envelope and is constructed of end sections 25 and 26 of suitable material, such as glass or an appropriate ceramic material. These sections are bonded at their adjacent ends to rings 27 of Kovar or other suitable metal which will permit welding to a metal sleeve 28 of copper or other suitable metal forming a contracted section in the tube of reduced diameter and providing a support for a circumambient ring magnet 29 positioned with one of its poles towards the end section 26 and its other pole towards the end section 25.

The other end of the tube section 25 is constructed with an end 30 having a sealed bond with a tubular support 31 connected to one end of a sleeve 32 of copper or other suitable metal and a high potential terminal structure 33 having its outermost end projecting beyond the adjacent end of the section 25 and provided with a series of cooling fins 34. At the innermost end of the terminal 33 there is positioned a disc shaped target 35 constructed of a suitable metal such as silver, this target forming the cathode electrode of the tube. While the target 35 has been described as being of silver, other metals having suitable characteristics may be utilized for the target. For example, a zirconium target which has been caused to absorb a large quantity of tritium, has been used, but this has the disadvantage that in use the target tends to heat up and loses tritium, thus affecting the accelerator operation.

The other end of the section 26 is bonded to a connecting sleeve support 36 having a sealed connection at its outermost end with a tubular metallic end closure 37 formed with an inwardly projecting sleeve 38 which is closed at its inner end, and constructed of a material which will be ineffectual to distort magnetic lines of force. The end closure and associated sleeve provide a tubular socket 39 adapted to receive a bar magnet 40 endwise therein. The magnet 40 is positioned with one of its poles facing the sleeve 28 and so that similar poles of the ring magnet 29 and the bar magnet 40 will be juxtaposed, for example, either north poles or south poles.

The interior of the tube envelope is charged with a hydrogen gas consisting of a mixture of deuterium and tritium, this gas being under low pressure in the range of from .05 to 5 microns. While it is possible to use different proportions of deuterium and tritium, in the present instance we have used these gases in equal proportions.

Conventional means may be utilized for supplying the high voltages required for acceleration, and for such purpose a Cockcroft-Walton generator is mounted in the exploration unit, this generator having a high voltage connection 41 with the terminal structure 33 so that the negative side of a 40 to 150 kv. direct current potential source is applied to the target 35. The positive side of this potential source is connected through a resistor 42 with the sleeve 28 or to the sleeve 38. This resistor serves as a regulator to prevent runaway of the tube due to variations in voltage and/or gas pressure therein. Another potential source of substantially 2 kv. is connected with its positive side to the sleeve 28 and its negative grounded side with the end closure and sleeve 38. While direct current sources have been illustrated, it is to be understood that alternating current sources may be used, if desired.

The operation of the above described device for producing neutrons is substantially along the following lines. Electrons appearing within the tube will be attracted to the positive electrode sleeve 28, one of these electrons being indicated by the numeral 43. As this electron enters the sleeve 28 it will be subjected to the magnetic field of ring magnet 29 and bar magnet 40 in such a way that the electron will be caused to follow a spiral path about the axis of the sleeve 28, and due to the combined effects of the negatively charged electrodes formed by the target 35 and sleeve 38 will be caused to oscillate with respect to the ends of the sleeve 28 and ring magnet 29. By thus lengthening the path of travel of the electron, it is possible to ionize the gas at the relatively low pressure utilized. The electron will travel along its curved path until it strikes an atom and ionizes it. The electron will not pass directly to the electrode to which it is attracted, because of the effect of the magnetic field.

Deuterium and tritium ions, one of these ions being indicated by the numeral 44, produced within the sleeve 28 will be attracted towards the electrode formed by the sleeve 38, and towards the electrode formed by the target 35 by virtue of the potential differences existing between the electrodes, most of the ions travelling towards the target 35. The accelerated ions strike the target face and act to accumulate both deuterium and tritium ions in the target material during initial operation of the tube. As additional ions of deuterium and tritium are produced and accelerated to bombard the accumulated deuterium and tritium ions on the target, the deuterium-tritium reaction as well as tritium-deuterium ensues with the emission of high energy neutrons which are utilized for irradiating the well formation or other material.

The operation of the accelerating tube in effect forms a pump in that the gas ionization and bombardment of the target result in depleting the gas mixture within the tube envelope. Unless this depletion is overcome by replenishing the gas, the action of the tube cleans out the tube gas an will eventually stop the tube operation due to lack of ionizing material. This difficulty is overcome in the present invention by the provision of a self-contained reservoir from which the gas depletion is counteracted by the supply of additional deuterium and tritium gas.

In the illustrated embodiment of the invention, the envelope interior connects with the interior of a small neck portion 45 containing a heater coil 46 having a terminal connection wire brought out through a sealed end 47. This wire is connected with one side of a potential source which may be on the order of one volt. The other end of this coil is connected electrically with the end closure 37. The heater coil is constructed of a metal which upon being heated and cooled will absorb or take up deuterium and tritium gas from the tube and thus form a storage which may subsequently again be supplied to the tube by the expedient of heating the coil by passage of current therethrough. During the tube construction, the coil 46 is heated after the tube is charged with deuterium and tritium gas, and then permitted to cool down and in so doing take up and store the deuterium and tritium molecules. During tube operation, the coil current is adjusted so that gas may be liberated at the same rate that the gas cleanup takes place due to the pumping action inherent in the tube operation as previously explained. It is thus possible to maintain a constant gas supply in the tube and prevent cleanup and stoppage due to lack of ionizing material. Titanium and zirconium have been used as the coil material for this purpose.

Referring now to FIG. 2, oil well exploratory apparatus embodying the above described accelerator has been diagrammatically illustrated. As there shown, a typical well bore structure 50 passes from the ground surface 51 downwardly past a plurality of different formation structures.

At the ground surface, there is illustrated a surface station as generally indicated by the numeral 52. This station includes suitable hoisting equipment such as a hoisting drum 53 having a hoisting cable conductor 54 trained over a guide pulley 55 and connected to an exploration unit within the well bore, as generally indicated by the numeral 56. The hoisting drum is shown as being provided with suitable indicating mechanism which may comprise a rotating pointer 57 associated with a graduated dial 58, or other suitable means for indicating the amount of cable which has been wound and unwound thereon or in other words the position of the exploration unit within the well bore. With this equipment as briefly described, the exploration unit may be readily controlled and moved within the well bore in carrying out the logging operations in a manner well understood in the oil industry.

The exploration unit broadly comprises a detector 59, and a neutron source 60 which embodies the accelerator 23 as described above, the accelerator being connected with a suitable high voltage supply 61.

In utilizing this equipment for making a radioactivity log of a well, the exploration unit 56 is moved through the well bore. Neutrons from the neutron source 60 irradiate the surrounding formations and resulting radiations influenced by the formations are detected by the detector 59. A signal from the detector is transmitted to the surface detecting devices and equipment 62 by which the significance of the radiations from the well formation are determined.

More specifically, the detector may comprise a scintillation spectrometer of the type described in United States Letters Patent of Robert W. Pringle et al. No. 2,686,266 entitled Improvement in Radiation Detectors, wherein crystal means are adapted to scintillate under the returning radiations from the formation caused by the bombardment with high energy neutrons. The scintillations are detected and transmitted to the surface detecting devices and equipment where they are interpreted in terms of the characteristics of the formation being investigated.

Various and appropriate detecting devices are utilized, and by way of illustration are shown more specifically in FIG. 3 as including an amplifier 63 through which the hoisting cable conductor 54 feeds schematically represented circuits containing an integral discriminator 64 with an associated scaler 65 and smoothing circuit and recorder 66. A differential discriminator 67 or other suitable energy pulse height indicating devices and smoothing circuit and recorder 68 may be utilized in analyzing the radiations from the substance or formation being investigated. A camera-cathode ray oscillograph 69 may be used also, as well as various types of information storage devices, as generally indicated at 70, and which may include magnetostatic devices, electrostatic devices and the like and may incorporate a read out device as indicated at 71.

Referring to FIG. 4, there is illustrated a characteristic spectrum in which pulse height (energy) is plotted against time. This spectrum shows a characteristic spectral line 72 and line 73 which directly indicate the presence of carbon and hydrogen, in other words the presence of oil. In a similar manner direct identifying spectral lines may be obtained for other substances.

There are some measurements which can only be made if the neutron source can be modulated or turned on or off so that the resulting radiations may be detected during intervals when the substance under investigation is not being bombarded. As an example of a pulsating arrangement, an A.C. or pulsating current circuit may be connected across the resistor 42, as shown in FIG. 5, a capacitor 74 of appropriate size being inserted in the circuit.

An alternative arrangement is shown in FIG. 6, wherein a mechanical or electronic switch, as diagrammatically illustrated and indicated by the numeral 75, is utilized to alternately connect and disconnect the accelerator and detector with respect to their circuits so as to be able to bombard a substance in the formation and subsequently detect the radiations therefrom after the bombardment ceases.

The pulsing and switching arrangements illustrated in FIGS. 5 and 6 are of importance in that they provide means whereby the short-life isotopes may be studied. Such an operation could not be accomplished with the previously available sources such as polonium-beryllium or radium-beryllium.

The study of isotopes having differing half-lives may be facilitated further by providing surface detecting devices which are synchronized with the detecting means in the exploration unit in the well bore so as to operate for a period of time immediately following or after a predetermined time delay interval following each pulsed or periodic bombardment of the formation as described above. By varying the time delay, the time period of investigation may be shifted so as to form in effect a gate for selectively studying the different isotopes. For example, at one position of the gate very short-life isotopes would be detected while at other positions isotopes of different half-life would be detected, but not the short-life isotopes. Thus, if a material has a half-life in the order of twenty or thirty thousandths of a second, the surface detector would be turned on for a period of thirty thousandths of a second following a bombardment and then turned off until another bombardment takes place. On the other hand, the detecting device may be made insensitive for several thousandths of a second after the bombardment ceases, and sensitive either for a short or long period thereafter. Such an arrangement will permit, for example, analysis with respect to 7 second Nitrogen due to neutron bombardment of oxygen in the formation, thus giving an indication of oxygen, which with an accompanying hydrogen spectrum would indicate the presence of water.

The above is accomplished by utilizing a suitable mechanical or electronic timing switch, as diagrammatically illustrated at 67', which will be synchronized with the operation of the detecting means in the exploration unit, and operate to turn the differential discriminator 67 or other desired detecting device on and off at any desired interval of time after the bombardment of the formation.

Various constructions may be utilized for mounting the accelerator and auxiliary devices within the exploration unit 56. The unit housing has an outer wall 76 of steel or other suitable material adapted to withstand the high pressures experienced in deep well bores.

The accelerator, high voltage source and associated devices must, of course, be suitably insulated, and to this end are mounted within a sleeve 77 of glass or suitable plastic, and containing an insulating oil or gas (not shown). A split shell 78 of stainless steel or other suitable metal is positioned inside the outer wall 76, this shell comprising a concentric wall and being longitudinally split. A wall 79 of copper or other suitable low resistance metal is positioned between the shell 78 and the sleeve 77, and forms an oil tight covering for the sleeve.

Various modifications may suggest themselves to those skilled in the art without departing from the spirit of our invention, and, hence, we do not wish to be restricted to the specific form shown or uses mentioned, except to the extent indicated in the appended claims.

We claim:

1. A source of neutrons comprising: a tube structure containing a gaseous mixture of deuterium and tritium; a spaced pair of electrodes supported in said envelope, one of said electrodes forming a target; a sleeve electrode positioned between said electrodes with the axis thereof extending in a path between said electrodes; a ring magnet positioned between said electrodes in coaxial relationship with said sleeve electrode; said ring magnet producing an axially extending magnetic field within said sleeve electrode; a first voltage source connected between said pair of electrodes; a second voltage source connected between said sleeve electrode and the other one of said pair of electrodes whereby both an electrical field and a magnetic field are produced within said sleeve electrode; said magnetic field and electric field coacting to produce ionization of said gaseous mixture and to accelerate resulting ions towards said target, said resulting ions impinging on said target to deplete the gaseous mixture; and electrically controlled deuterium and tritium storage means in said tube operable to replenish the gaseous mixture in said envelope as it is depleted in said target, the ions impinging on said target being retained by the target for reaction with subsequent accelerated ions to produce high energy neutrons.

2. A source of neutrons as set forth in claim 1 in which said other one of said pair of electrodes comprises a bar magnet having its magnetic poles aligned with the axis of said ring magnet.

3. A source of neutrons as set forth in claim 2 in which adjacent poles of said bar magnet and said ring magnet are of the same magnetic polarity.

4. A source of neutrons comprising, an envelope containing a pair of spaced electrodes, one of said electrodes comprising a self-building target, an ionizable gaseous mixture in said envelope, means between said electrodes for both ionizing said gaseous mixture and accelerating resulting ions towards said target, said target comprising a material which absorbs said ions to deplete said gaseous mixture whereby said source of gaseous mixture is built up in said target for bombardment by subsequent ions, means contained in said envelope for replenishing said gaseous mixture, said ionizing and accelerating means comprising a sleeve electrode having its axis extending in a path between said electrodes, a ring magnet coaxially arranged with said sleeve electrode, and a bar magnet axially aligned with said ring magnet with adjacent ends of said ring magnet and said bar magnet having the same magnetic polarity.

5. A neutron source as set forth in claim 4 in which said replenishing means comprises a heating element which liberates said gaseous mixture when heated.

References Cited in the file of this patent

UNITED STATES PATENTS

| | | |
|---|---|---|
| 2,211,668 | Penning | Aug. 13, 1940 |
| 2,251,190 | Kallmann et al. | July 29, 1941 |
| 2,686,268 | Martin et al. | Aug. 10, 1954 |
| 2,689,918 | Youmans | Sept. 21, 1954 |
| 2,712,081 | Fearon et al. | June 28, 1955 |
| 2,735,019 | Dewan et al. | Feb. 14, 1956 |
| 2,740,898 | Youmans | Apr. 3, 1956 |
| 2,769,096 | Frey | Oct. 30, 1956 |
| 2,908,823 | Ely | Oct. 13, 1959 |

FOREIGN PATENTS

| | | |
|---|---|---|
| 724,441 | Great Britain | Feb. 23, 1955 |

UNITED STATES PATENT OFFICE
CERTIFICATE OF CORRECTION

Patent No. 3,020,408                          February 6, 1962

Philip W. Martin et al.

It is hereby certified that error appears in the above numbered patent requiring correction and that the said Letters Patent should read as corrected below.

Column 1, line 58, strike out "a"; column 5, line 5, before "ensues" insert -- reaction --; line 13, for "an" read -- and --

Signed and sealed this 19th day of June 1962.

(SEAL)
Attest:

ERNEST W. SWIDER
Attesting Officer

DAVID L. LADD
Commissioner of Patents